S. PERKES.
Ore Mill.

No. 11,081.

3 Sheets—Sheet 1.

Patented June 13, 1854.

S. PERKES.
Ore Mill.

No. 11,081.

3 Sheets—Sheet 3.

Patented June 13, 1854.

UNITED STATES PATENT OFFICE.

SAMUEL PERKES, OF WALBROOK, LONDON, ENGLAND.

IMPROVEMENT IN CRUSHING AND GRINDING QUARTZ AND MINERALS.

Specification forming part of Letters Patent No. 11,081, dated June 13, 1854.

*To all whom it may concern:*

Figure 1:
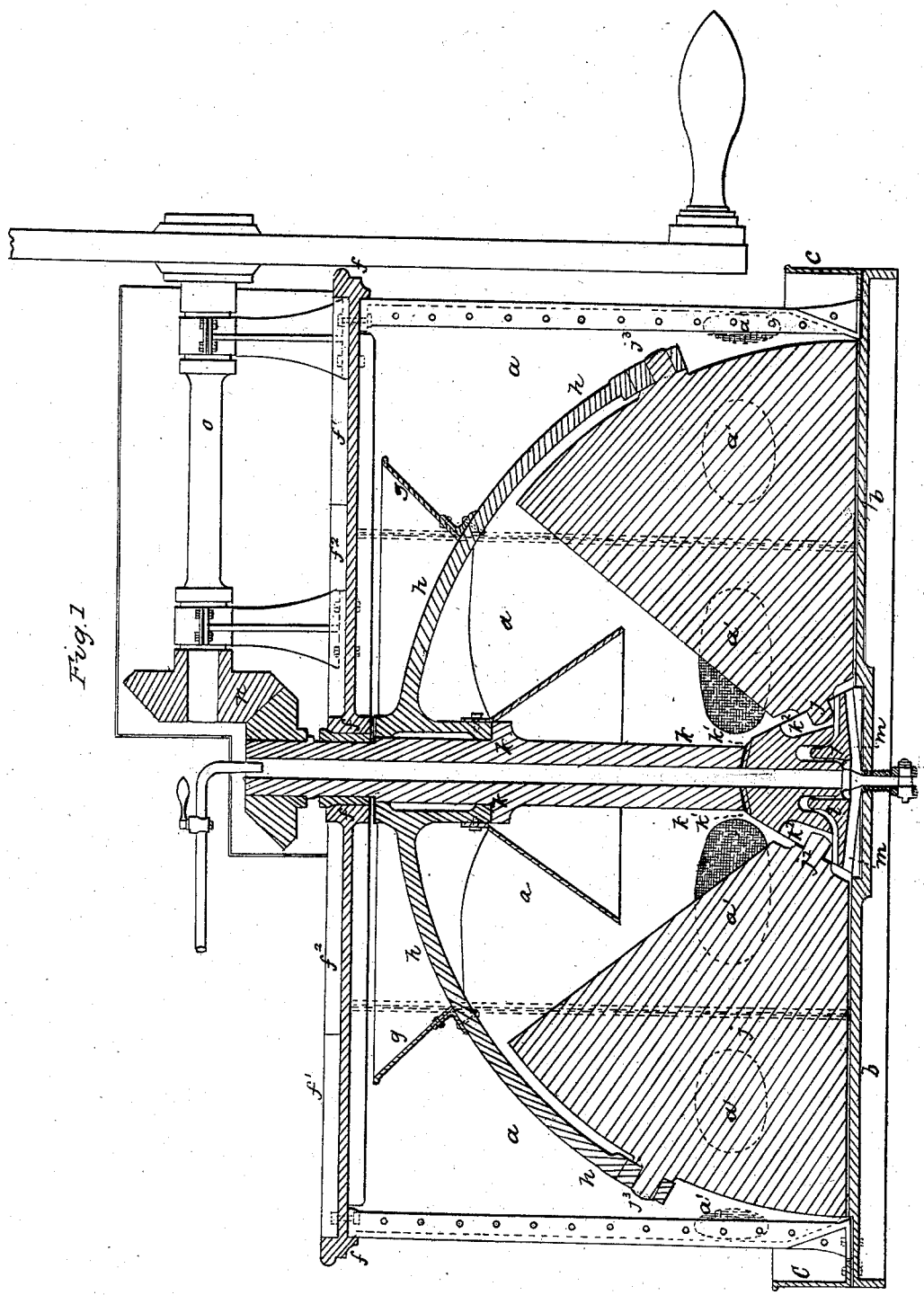
Figure 2:
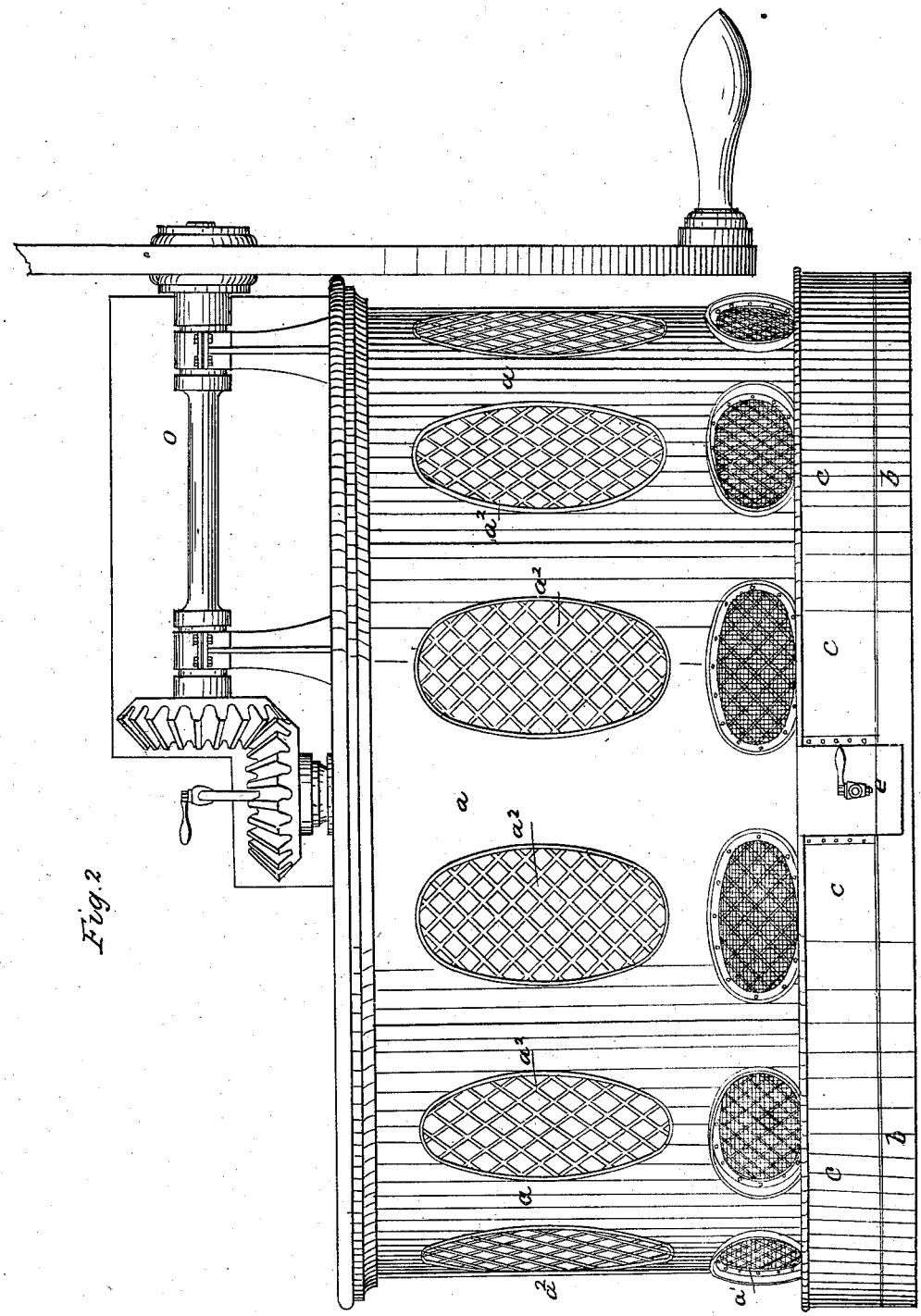
Figure 3:
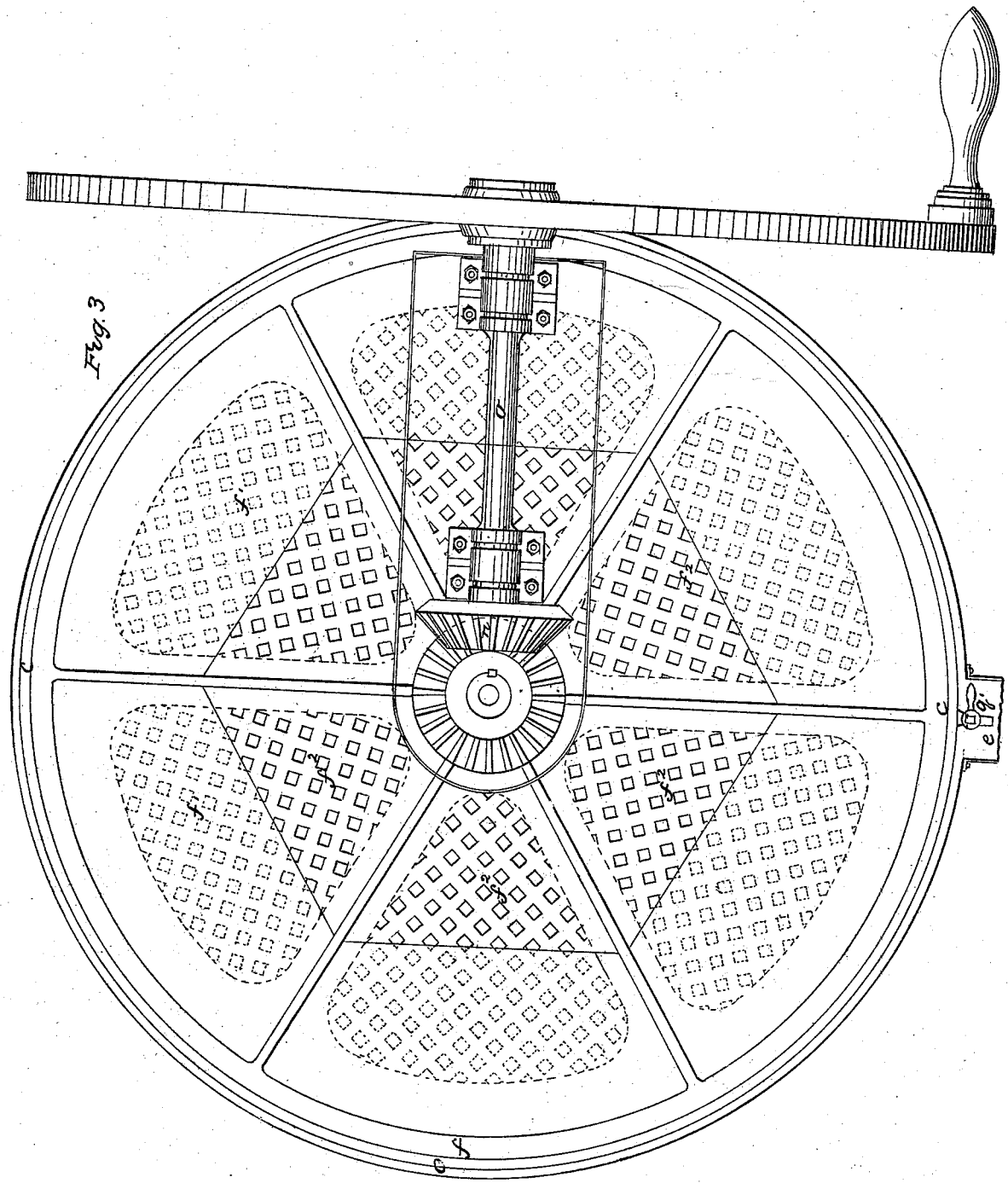

Be it known that I, SAMUEL PERKES, civil engineer, of Walbrook, in the city of London, England, a subject of the Queen of Great Britain, have invented or discovered new and useful Improvements in Crushing and Grinding Quartz and Minerals; and I, the said SAMUEL PERKES, do hereby declare the nature of my said invention and the manner in which the same is to be performed are described and ascertained in and by the following statement thereof, reference being had to the drawings hereunto annexed, and to the figures and letters marked thereon—that is to say:

In the drawings, Figure 1 is a vertical section of a machine constructed and combined according to my invention. Fig. 2 is an external view in elevation, and Fig. 3 is a plan of the machine.

The drawings are each to a scale of one and a half inches the foot, and the same letters of reference are used to indicate the same parts in all the figures.

$a\ a$ is a cylindrical vessel made up of several sections; or, when the machines are small, the vessel may be made in one piece and put together by flanges and screws and nuts, as is shown.

$b$ is the bottom, which is fixed by its flanges and by screws and nuts to the cylindrical vessel $a$, and at the same time a trough $c$ is produced all around the vessel $a$, into which the washings from the vessel $a$ flow, and they are conducted away by the spout $e$. Such washings flow out from the vessel $a\ a$ through the openings $a'\ a'$, which are covered with wire-cloth, (preferring about six thousand four hundred meshes to the square inch,) and there are other openings at $a^2\ a^2$ in the vessel $a$, with gratings; but these are not essential, nor are the wire-work coverings over the openings $a'$ absolutely required, but they are considered desirable where it is wished to prevent the workmen from removing any of the quicksilver or matters from the interior of the vessel $a$.

$f$ is the cover to the vessel $a$, which at its upper surface has a floor $f'$ fixed on part of its upper surface, and at its under surface gratings $f^2$ are fixed. By this arrangement the gratings toward the middle are uncovered and the broken quartz or minerals which are to be crushed are shoveled through the gratings and the quartz or mineral fall into the hopper $g$, fixed to the arms $h\ h$, as shown; hence the broken quartz or mineral fall toward the center of the vessel $a$; and in order to prevent the same descending in the center there is a conical guard $i$, which deflects the broken matters away from the center and onto the conical crushing-rollers $j\ j$, the number of which used in the vessel $a\ a$ may be varied. I prefer to use six, and these receive motion in the following manner: $k$ is a hollow shaft or vertical axis, which at its lower end is formed, as is shown, by the section Fig. 1 of the drawings, there being a step or bearing $l$ at the center of the bottom $b$ of the vessel $a$, and which fits into a recess in the bottom $b$. In the step or bearing $l$ are openings or passages $m\ m$ for the passage of the quicksilver or water from the hollow axis $k$. A constant supply of water (preferring hot water) is introduced through the hollow axis $k$, which, when there is no quicksilver, will flow through these passages $m$ into the vessel $a$, and thus wash the matters under process, and there are also openings or passages $k'$ in the hollow axis or shaft $k$, through which water may flow over the matters under process when quicksilver is used. The lower part of the axis $k$ is made so as to enter the step or bearing $l$, and also to cover it to prevent the passage of gritty matters in that direction, and the lower part of the axis $k$ is formed with grooves $k^2$, one for receiving each of the axles or necks $j^2$ of the conical roller $j$, by which means these rollers are enabled to descend to and come in contact with the bottom $b$, and it can also rise above the bottom $b$, according as more or less quartz or minerals are for the time being on the bottom $b$. The other necks or axes $j^3$ of the rollers $j$ are received into slits or openings in the arms $k$, as is shown; or in place of using arms which would require to be of great weight to obtain the requisite strength and stiffness I prefer to use an inverted-bell-formed frame or skeleton dome $h\ h$, with openings through at the upper part where the hopper is fixed in order to feed the broken quartz or mineral through into the vessel $a$. By this arrangement great stiffness and strength may readily be obtained whether arms $h$ or frame $h$ be used, the same is fixed to and revolves with the axis $k$, and the axis $k$ may be made to revolve in any convenient manner. I, however, prefer to use a beveled toothed wheel $n$ thereon, which is driven by the shaft or axis $o$, driven by hand or by other convenient means. It is desirable, where it can be conveniently done, to heat the lower part of the vessel $a$, so as to keep the matters under process to a temperature of about 100° Fahrenheit.

In using this machine, when crushing, grinding, and amalgamation are to be simultaneously carried on, (and I would state that my invention is particularly directed to such cases, though the machine may be used with advantage where only grinding is required to be carried on,) a quantity of quicksilver is introduced into the vessel $a$, so as partly to fill the vessel $a$, leaving space for the constant supply of broken quartz or mineral, taking care that neither the quicksilver or the broken quartz or mineral rise to the openings $a'$ in the vessel $a$, for it is only the wash waters and the matters carried up thereby which it is desired should flow off from the vessel $a$ during the process of crushing, grinding, and amalgamating the quartz or minerals by the machine. When working of the machine a quantity of broken quartz or mineral is fed in, as above explained, and a constant flow of water is to be kept up through the hollow axis $k$, by which means the quartz or minerals will be crushed and ground in the quicksilver, and a constant washing by water will be taking place in the vessel $a$, and such of the matters as are soluble in the water and are sufficiently light to rise up therewith will flow off at $a'$ $a'$ through the wire-cloth. The quicksilver may be drawn off by a cock $q$ underneath, or one at the side at $q'$ communicating with the center of the bottom, which is made slightly inclined toward the center.

Having thus described the nature of my said invention, I would have it understood that I do not claim any of the parts when separately considered; but

What I claim is—

The combination of the vessel $a$, the trough $c$, the conical crushing-rollers $j$, the hollow axis $k$, and the arrangement for supplying water, substantially as herein described.

SAMUEL PERKES.

Witnesses:
GEO. PITT,
JNO. ALCOCK.